UNITED STATES PATENT OFFICE.

LAURA E. BUSH, OF JUG TAVERN, GEORGIA.

MEDICAL COMPOUND FOR BURNS, SCALDS, &c.

SPECIFICATION forming part of Letters Patent No. 264,857, dated September 26, 1882.

Application filed July 6, 1882. (No specimens.)

*To all whom it may concern:*

Be it known that I, Mistress LAURA E. BUSH, a citizen of the United States, residing at Jug Tavern, in the county of Walton and State of Georgia, have invented a new and useful composition of matter to be used for the cure of burns, scalds, spasmodic croup, and other inflammations, of which the following is a specification.

My composition consists of the following ingredients combined in the proportions stated: red sassafras-root, one pound; pure water, one gallon, combined and reduced by boiling to one quart, this extract or tea, six ounces; pure olive-oil, two ounces; water of ammonia, two ounces; crude petroleum-oil, two ounces; pure castor-oil, one gallon. These ingredients are to be thoroughly mingled by agitation, and make in bulk one gallon and twelve ounces.

By the use of this composition all cutaneous inflammations from burns, scalds, and the like are speedily relieved and thoroughly healed, and spasmodic croup among children.

For burns and scalds, apply the composition directly to the parts affected, excluding the air, bandaging loosely with cotton or linen cloth or other like material.

For spasmodic croup, to be taken internally without dilution, and applied externally to the throat and chest at the same time. Doses for infants to six months old, one-half tea-spoonful; for children from six to twelve months old, one tea-spoonful; for adults, table-spoonful, to be repeated every hour until the patient is relieved.

What I claim, and desire to secure by Letters Patent, is—

The herein-described composition for treatment of burns, &c., consisting of infusion of sassafras-root, pure olive-oil, water of ammonia, crude petroleum, and castor-oil, in the proportions set forth.

LAURA EMELINE BUSH.

Witnesses:
JNO. D. MALSBY,
WM. H. GOODWIN.